March 18, 1930.  W. EHRHART  1,751,312
BAKING APPARATUS
Filed July 16, 1926   6 Sheets-Sheet 4
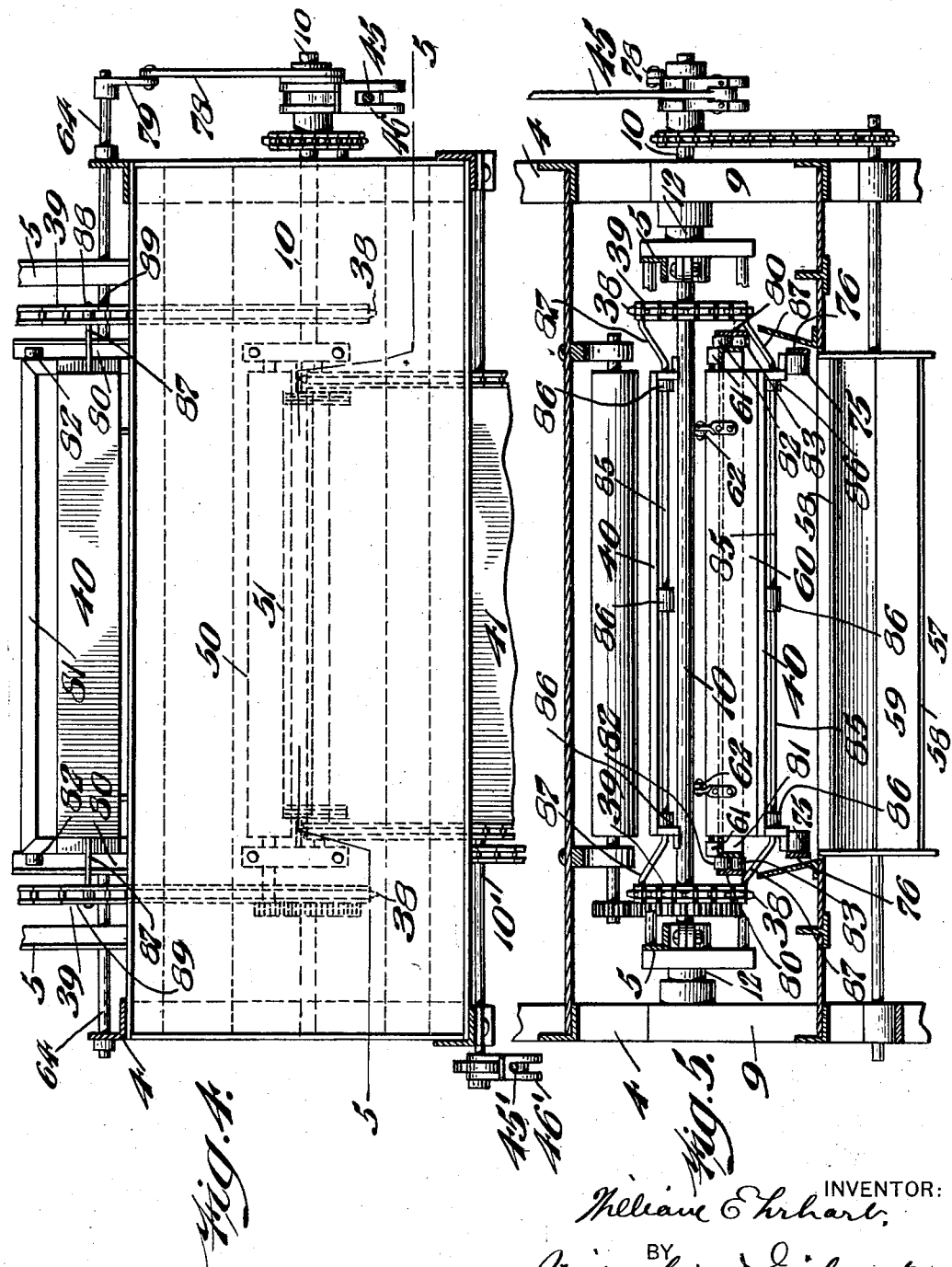
INVENTOR:
William Ehrhart,
BY
ATTORNEYS.

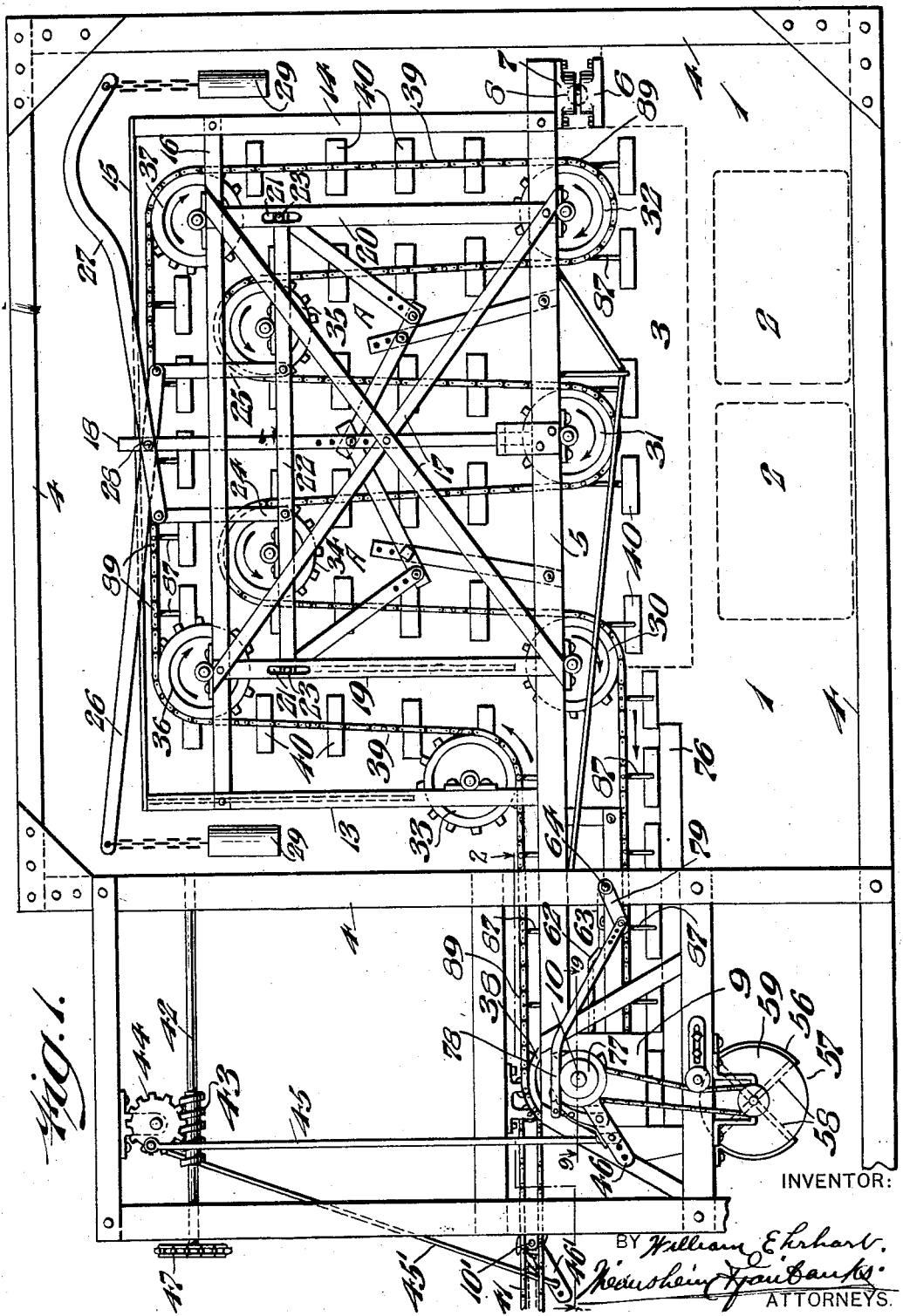

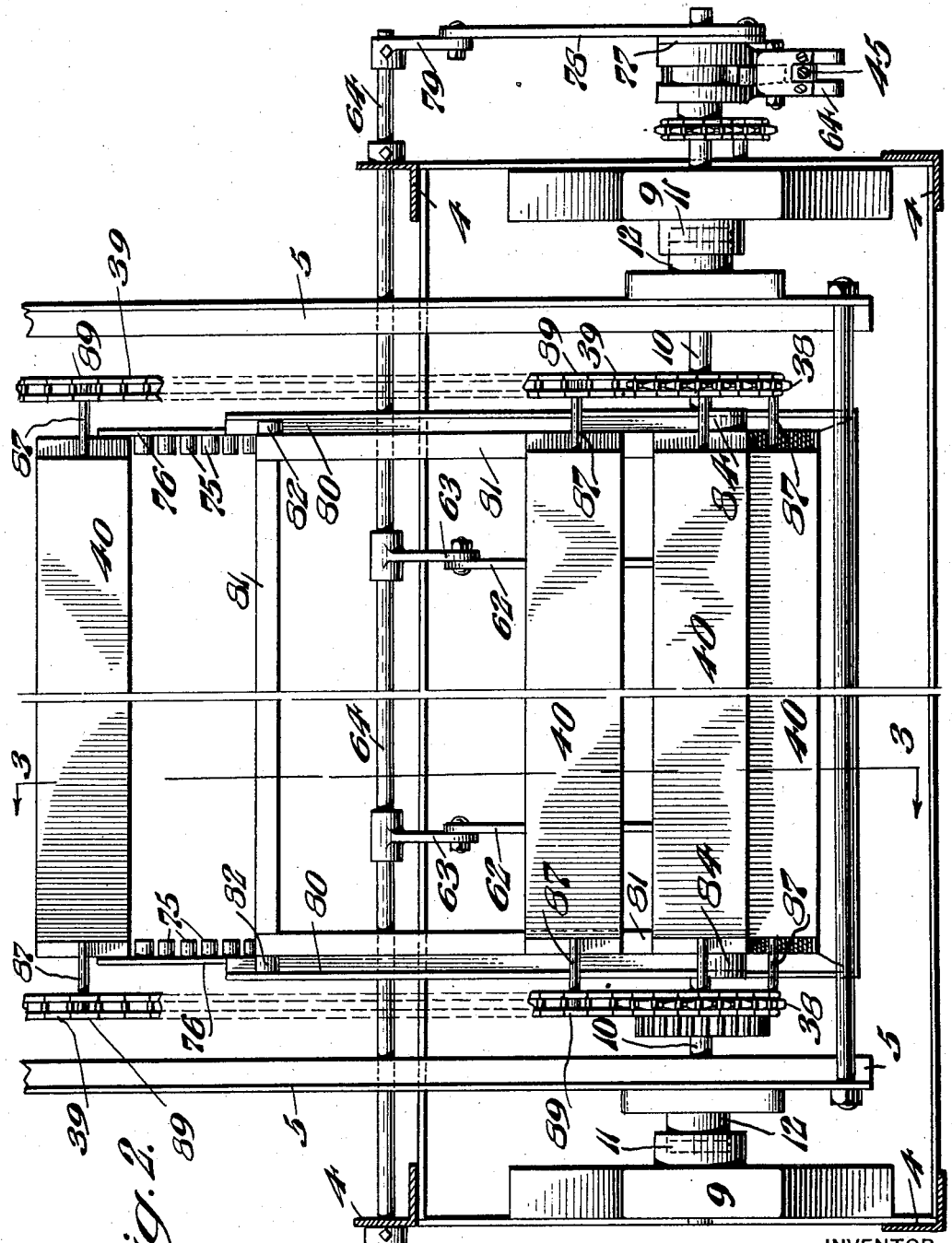

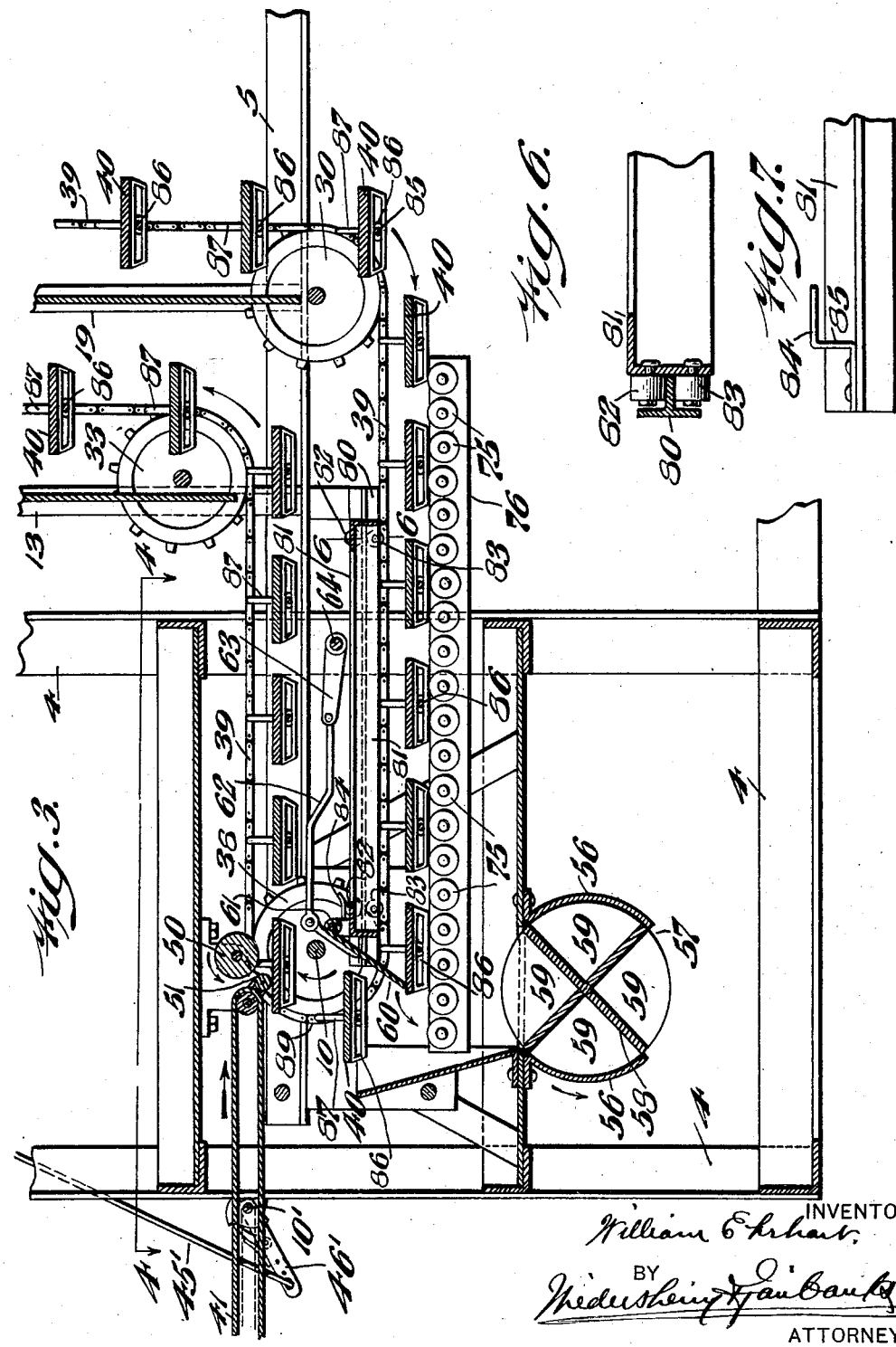

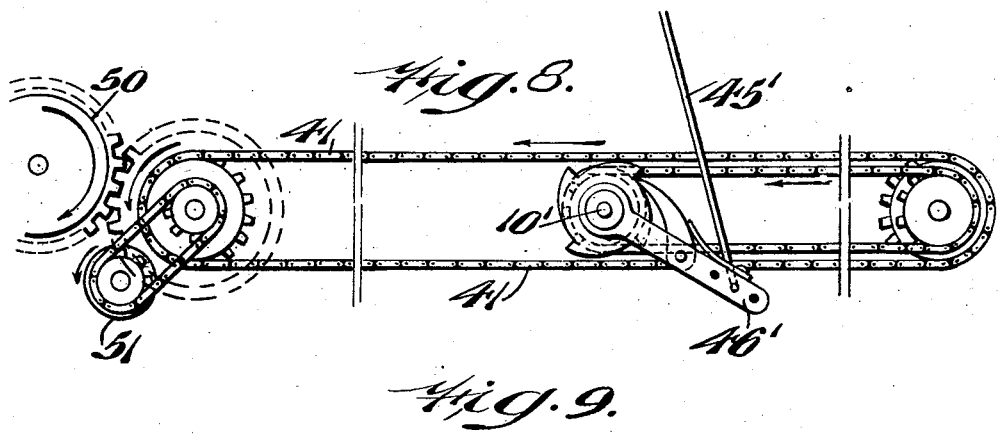
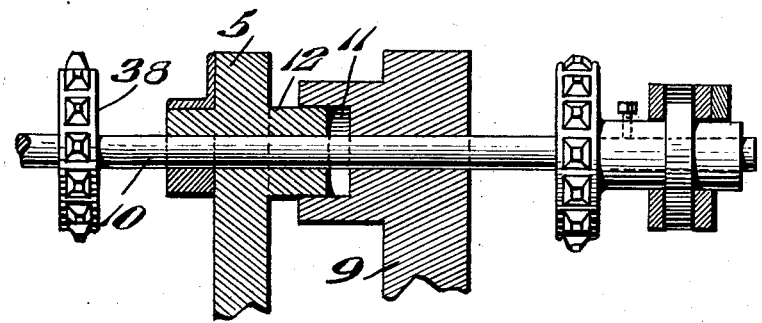
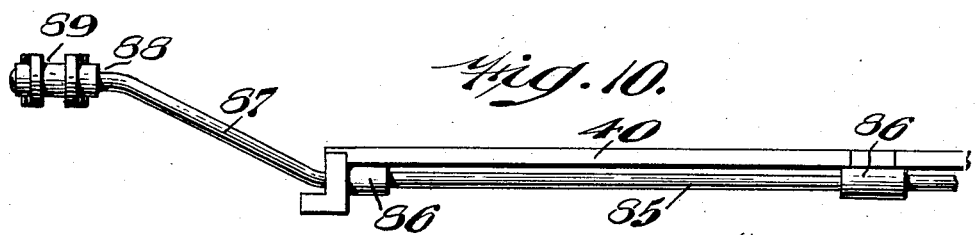
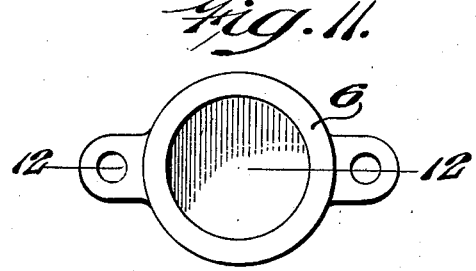
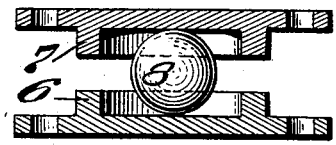

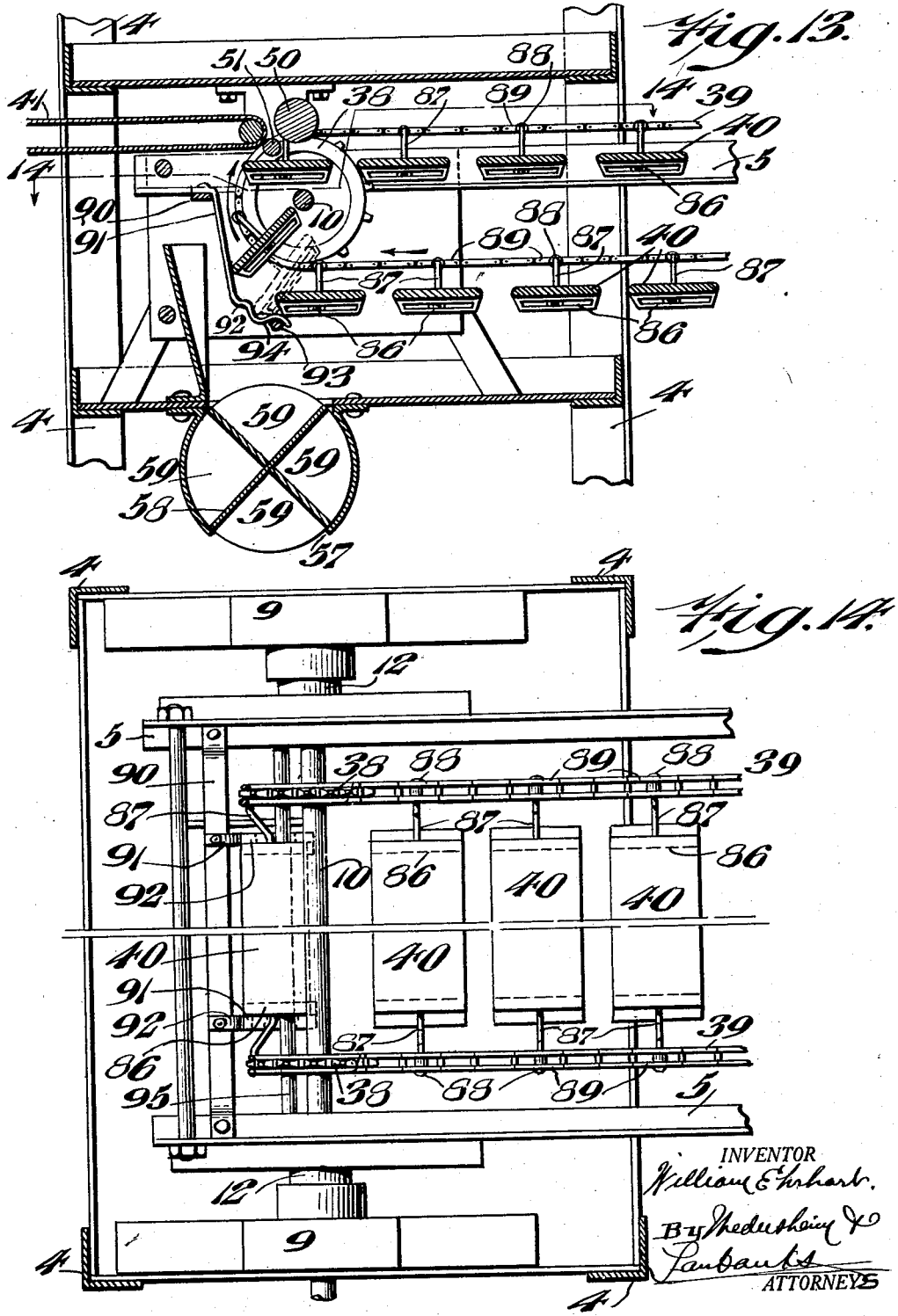

Patented Mar. 18, 1930

1,751,312

UNITED STATES PATENT OFFICE

WILLIAM EHRHART, OF LANCASTER, PENNSYLVANIA

BAKING APPARATUS

Application filed July 16, 1926. Serial No. 122,772.

This invention, stated in its broadest aspect, relates to baking ovens in which the article to be baked is moved in a circuitous path, and has more especial relation to an oven of this kind particularly adapted for the baking of pretzels, rolls, or similar edible articles.

In the past considerable difficulty has been experienced in ovens of this kind due to the fact that the metal frame work carrying endless conveyors so contracted and expanded as to cause the conveyor parts to become out of alignment and otherwise fail to properly function.

The leading object of the present invention may be said to reside in the provision of mechanism of novel structure in which the moving parts are entirely independent of the casing walls and are therefore free to move, expand or contract without disturbing the walls of the casing; all of which results in the saving of power because of the freedom from disalignment of the working parts due to stress and strain.

A further object of the present invention may be said to reside in the provision of mechanism whereby automatic adjustment of the working parts takes place simultaneously with contraction and expansion of the apparatus parts.

A further object of the present invention is to provide automatic or self adjusting apparatus for attaining the results sought in the foregoing object.

A still further object of the present invention is to provide for a more efficient ejectment of pretzels or the like subsequent to the baking period.

A still further object of the present invention resides in the provision of general details of construction, arrangement, combination, and connection of parts for attaining the results sought by the previously mentioned objects.

With these and other objects in view, the invention consists of the novel construction hereinafter described and finally claimed.

The nature, characteristic features and scope of the invention will be more fully understood from the following description taken in connection with the accompanying drawings forming part hereof, and in which:

Fig. 1 is a view in side elevation of an oven embodying features of the invention.

Fig. 2 is a view in horizontal section taken upon the line 2—2 of Fig. 1.

Fig. 3 is a vertical section taken upon the line 3—3 of Fig. 2.

Fig. 4 is a view in horizontal section taken upon the line 4—4 of Fig. 3.

Fig. 5 is a view in vertical section taken upon the line 5—5 of Fig. 4.

Fig. 6 is a fragmentary view in section taken upon the line 6—6 of Fig. 3.

Fig. 7 is a view in detail hereinafter referred to.

Fig. 8 is a view in elevation illustrating a detail of sprocket chain arrangement shown at the left hand side of Fig. 1.

Fig. 9 is a fragmentary view principally in section taken upon the line 9—9 of Fig. 1.

Fig. 10 is a detail view hereinafter referred to.

Fig. 11 is a view of one of the ball receiving plates shown in Fig. 12.

Figure 12 is a view in section taken upon the line 12—12 of Fig. 11.

Figure 13 is a fragmentary view, principally in section, illustrating a modified form of pretzel ejecting means.

Figure 14 is a view in section taken upon the line 14—14 of Fig. 13.

For the purpose of illustrating my invention I have shown in the accompanying drawings several forms thereof which are at present preferred by me, since the same have been found in practice to give satisfactory and reliable results, although it is to be understood that the various instrumentalities of which my invention consists can be variously arranged and organized and that my invention is not limited to the precise arrangement and organization of the instrumentalities as herein shown and described.

Referring to the drawings in detail, the reference numeral 1 indicates the base work of the oven, as brick; 2 the fire place; and 3, the oven proper. Usually a fixed metal frame work 4 is built up around the base and oven and an outer casing, as brick (not shown in the drawings) built inside the metal frame 4. According to the present invention I provide with the oven 3 a relatively movable framework which supports the conveyor for an article to be baked. Extending longitudinally of the oven are a pair of horizontally disposed rails 5 movably supported at each end of the oven. Referring now to the right hand side of Fig. 1, and to Figs. 11 and 12, a description will be given of the outer end of said rails 5. As the rails 5 are duplicates of one another a description of one will suffice. Fixed to the frame 4 is a dished member 6 and fixed to the underside of a rail 5 is a companion member 7. Thus the dished or recessed portions of the members 6 and 7 are oppositely disposed and between them is arranged a spherical member 8. Thus in effect a ball bearing joint is provided for each of said rails and any longitudinal or cross wise movement of these rails, as by expansion and contraction, is taken care of without undue stress or strain by reason of such ball bearing joint connections. Taking up now the opposite end of each rail 5 attention is directed to Fig. 9 as well as the left hand end of Fig. 1. The reference numeral 9 designates a bearing block journalled in which is a cross shaft 10. A bearing block 9 is provided with an annular recess 11. Mounted for slight endwise movement upon shaft 10 are the rails 5 each rail being provided with a boss 12 having a sliding fit with the recess 11 of a bearing block 9. Thus, contraction and expansion of the cross wise members is taken care of without stress or strain upon said members because they have relative endwise movement, as just described, which taken in connection with the ball bearing connection at the opposite end of these rails provides for more or less freedom of movement both longitudinally and laterally considered. Fixed to and vertically extended from each rail 5 are end pieces 13 and 14 connected at their tops by means of horizontal angle pieces 15. Also connecting the end angle pieces 13 and 14 and below the angle pieces 15 and spaced therefrom are other horizontal angle pieces 16 which are braced with respect to the rails 5 by diagonally arranged bars 17. Intermediate the end angle pieces 13 and 14 upon each side of the oven are arranged vertical movable rod 18. Arranged upon each side of the central rod 18 are other vertical, fixed supports 19 and 20 which latter supports are vertically slotted as at 21. Movable vertically with respect to slots 21 is a horizontal member 22, studs 23 being provided for guiding the member 22. The horizontal member 22 is pivotally connected by means of links 24 and 25 with pivoted levers 26 and 27 which levers have pivotal relation at 28 with the uprights 18. These levers 26 and 27 are each provided at their free ends with a counterweight 29. The counterweights have the tendency to raise the horizontal member 22 and to lower movable rod 18. In addition to supporting the cross member 22 by means of the slot and stud connection, a series of levers constituting a lazy tong connection is arranged between said member 22, the upright 18, and a rail 5. This lazy tong system of levers is designated A in the drawings, and it will be understood that the above described parts are arranged upon opposite sides of the apparatus. Journalled to the bottom of each rail 5 are a series of sprocket wheels designated 30 and 31 and 32. Journalled to each end support 13 is a sprocket wheel 33. Journalled upon the top of each horizontal member 16 are sprocket wheels 36 and 37. Fixed to shaft 10 are conventional sprocket wheels 38. Around these various sprocket wheels, just referred to, travel a pair of sprocket chains 39 suspended between which are a plurality of pretzel or like carriers 40, which carriers have pivotal relation with the endless conveyor thus formed. In operation the conveyor travels in the direction of the arrows in Fig. 1. Each carrier 40 is fixed, as at 86, to a horizontal rod 85 (see Fig. 10) midway between the inclined ends 87 of said rod 85. These inclined ends in turn have pivotal relation, as at 88, with opposed members 89 carried by sprocket chains 39.

In order to feed the pretzels or the like to the endless conveyor use is made of an endless conveyor 41, see left hand side of Figs. 1 to 3. The conveyor 41 must travel at the same rate of speed and at the same time as conveyor 39. Motion is imparted to the shaft 10 which drives the sprocket chains 39 forming the endless conveyor by means of a constantly driven shaft 42 provided with a worm gear 43 which drives a worm wheel 44 which in turn has connected therewith a link 45 which link is connected with a lever 46 for pawling shaft 10 for driving the sprocket chains 39 aforesaid. Motion is imparted to shaft 42 by means of a sprocket wheel 47 and sprocket chain (not shown in the drawing) as is indicated at the upper left hand side of Fig. 1. The above described mechanism as shown at the upper left hand side of Fig. 1 is of conventional form and constitutes no part of the present invention and is properly timed to secure proper movement of the endless conveyor and its co-operative parts. From the above described arrangement and construction of parts it is apparent that as pretzels or the like are fed by conveyor 41 to the conveyor as comprised by the sprocket chains 39 and carriers 40, pretzels are moved through the oven 3 in a circuitous path. The conveyor 41 is operated from worm gear 44, link 45' and ratchet 46' which operates shaft 10', see Fig. 1. Any contraction and expansion of the metal parts of the mechanism are substantially taken care of by the fact that each rail 5 has endwise or lateral movement at one end of the oven and has ball bearing connection at the opposite end of the oven and that this longitudinal and lateral movement of the rails 5 serves to a great extent to take care of possible distortion of the operating parts. This, taken in connection with the automatically adjustable parts arranged between the end supports 19 and 20 and slidable studs 23 serves to provide for self adjustment of the sprocket chains with respect to the various sprocket wheels. Thus, any expansion or contraction is taken care of by automatic adjustment of the horizontal parts 22 toward or away from the bottom rails 5 as is apparent. In this connection the counterweights 29 in effect serve to automatically move the horizontal rails 22 and rods 18 to required position.

Referring now to the feeding of unbaked articles as pretzels to the oven by endless conveyor 41, see Figs. 3 and 8, it is to be noted that at the place of delivery of the unbaked articles to the endless conveyor 39 which travels through the oven that a roller 50 rotating in the direction of the arrow in Fig. 3 is arranged adjacent the delivery end of the conveyor 41 and that intermediate the delivery end of the conveyor 41 and the roller 50 an auxiliary roller 51 is provided. This arrangement is so that unbaked articles passing from the delivery end of the conveyor 41 toward roller 50 are positively directed by the auxiliary roller 51.

A description will now be given of the manner of delivering baked articles from endless conveyor 39 the place of delivery being best seen at the left hand side of Fig. 3. As the carriers 40 move to the left in Fig. 3, they travel over rollers 75 upon each side of the apparatus which rollers are mounted in fixed brackets 76. The purpose of such rollers 75 is to lessen friction with respect to the conveyor carriers 40. In this connection it is to be noted that it is desirable that during a delivery period the pretzel or like carriers 40 be maintained in absolutely horizontal position. In order to conserve heat and aid in the maintenance of constant oven temperature which is essential to uniform baking, I arrange immediately below the ejecting point a fixed hopper 56 having an egress opening 58 provided with a series of pockets. As a pretzel is delivered to the uppermost of said pockets 59, see Fig. 3, from conveyor 39 it is apparent that cool air is kept away from the oven thereby conserving heat within the oven.

The pockets 59 of the rotatable member 58 are so arranged that a pocket 59 is always positioned below the foremost of the carrier trays 40 to receive a pretzel or the like as swept from said particular carrier or tray by the sweeper 60, see Fig. 3. Unless a pocket was so positioned crushing of pretzels would result.

In order to properly eject a baked article as a pretzel from the conveyor 39 to the hopper 56 use is made of a longitudinally movable sweeper 60. This sweeper 60 is pivotally arranged as at 61 and sweeping motion is imparted to the member 60 by means of a link 62 connected to an eccentric 63 mounted upon shaft 64. Motion may be imparted to shaft 64 from any desired source. In the drawings this motion is imparted from main shaft 10 by means of the link 78, the upper end of which is connected to one end of the lever 79 and the lower end of which is secured to the periphery of the wheel 77 which is fast on the shaft 10, the other end of the lever 79 being secured to the shaft 64 as will be understood from Fig. 2.

Arranged to the rear of sweeper 60 upon each side of the apparatus are side rails 80, best seen in Fig. 2. Adapted for free longitudinal movement back and forth along these rails 80 is a carriage 81 provided upon each side with a plurality of upper and lower rollers 82 and 83 adapted to track upon the rails 80. This arrangement is best seen in Fig. 6. At least one of the rails 80 is provided with a stop 84, see Fig. 7, to limit undue forward movement of the carrier 81. This is accomplished when the foremost upper roller 82 engages or abuts against the part 85 of stop 84. As the pretzel or like carriers 40 move forward with baked articles thereon the eccentric 63 pulls backward, in a sweeping direction, the sweeper 60 thus moving rearwardly carriage 81 at the same time. By this movement the lower edge of the sweeper 60 is elevated to a position above and to clear an oncoming carrier 40 wth a pretzel or the like thereon. As the loaded carrier 40 moves forward the sweeper 60 also moves forward at an accelerated rate of speed and sweeps the baked pretzel off the carrier 40 into the superimposed pocket 59 in hopper 56.

In the modified form shown in Figs. 13 and 14, the construction is the same as that shown and described in the foregoing figures with this exception: The pretzel ejecting mechanism is slightly modified. Instead of the sweeper 60 a fixed support 90 is employed, secured to which are a pair of legs 91 depending from said support, which legs each terminate in a forwardly extending finger 92, the forward end of each of which is convexed at 93 and concaved at 94. The rounded end of a carrier 40 rides over convexed end 93 and then because of pivotal connections 88 the carriers 40 are tripped (see dotted lines in Fig. 13) thus depositing a baked pretzel or the like within a compartment 59 of the rotary member therebelow. The vertical legs 91 serve to maintain the carriers 40 tilted during their movement in the direction of the arrow in Fig. 13. The free ends of fingers 92 are supported by a laterally arranged rod 95.

Having thus described my invention what I claim as new and desire to secure by Letters Patent, is:—

1. Baking apparatus of the character stated comprising an oven proper, a horizontally disposed frame having ball bearing connection at one end with said oven and having limited lateral movement at its opposite end with said oven, a fixed vertical frame carried by said horizontal frame, a counter-balanced, vertically movable frame interposed between said horizontal and vertical frames, said frames being entirely independent of the walls of the oven so as to be free to expand and contract without disturbing said walls, and an endless conveyor carried by said frame for moving articles to be baked through said oven.

2. Baking apparatus of the character stated, comprising an oven proper, a horizontally disposed frame having ball bearing connection at one end with said oven and having limited lateral movement at its opposite end with said oven, a fixed vertical frame carried by said horizontal frame, a counterbalanced vertically movable frame interposed between said horizontal and vertical frames, a plurality of sprocket wheels carried by said frames, an endless conveyor, including pivotal carriers, for moving in a circuitous path through said oven about said sprocket wheels, and means including a pawling mechanism for driving said conveyor.

3. Baking apparatus of the character stated, comprising an oven proper, a horizontally disposed frame having ball bearing connection at one end with said oven and having limited lateral movement at its opposite end with said oven, a fixed vertical frame carried by said horizontal frame, a counterbalanced vertically movable frame including slot and pin connections interposed between said horizontal and vertical frames, a plurality of sprocket wheels carried by said frames, an endless conveyor, including pivotal carriers, for moving in a circuitous path through said oven about said sprocket wheels, and means including a pawling mechanism for driving said conveyor.

4. Baking apparatus of the character stated, comprising an oven proper, a horizontally disposed frame having ball bearing connection at one end with said oven and having limited lateral movement at its opposite end with said oven, a fixed vertical frame, carried by said horizontal frame, a counterbalanced vertically movable frame interposed between said horizontal and vertical frames said movable frame including a series of transversely and vertically adjustable pivotal connections, a plurality of sprocket wheels carried by said frames, an endless conveyor, including pivotal carriers, for moving in a circuitous path through said oven about said sprocket wheels, and means including a pawling mechanism for driving said conveyor.

5. Baking apparatus of the character stated, comprising an oven proper, a horizontally disposed frame having ball bearing connection at one end with said oven and having limited lateral movement at its opposite end with said oven, a fixed vertical frame carried by said horizontal frame, a vertically movable frame interposed between said horizontal and vertical frames, a lazy tongs connection for said movable frame, a pair of pivotal levers provided with counterbalance weights, links connecting said levers with said movable frame, a plurality of sprocket wheels carried by said frames, an endless conveyor including carriers for moving in a circuitous path through said oven over said sprocket wheels, and means including pawling mechanism for operating said conveyor.

6. In baking apparatus, an oven, an endless conveyor including individual carriers for movement through said oven, means for moving certain of said carriers forward away from the oven in a horizontal manner, side supports including rollers over which said forward moving carriers travel, a receiving hopper, a rotatable member having pockets within said hopper to receive individual baked articles and means for sweeping an individual article from a carrier into a pocket.

7. In baking apparatus, an oven, an endless conveyor including individual carriers for movement through said oven, means for moving certain of said carriers upward or away from the oven in a horizontal manner, side supports including rollers over which said forward moving carriers travel, a receiving hopper, a rotatable member having pockets within said hopper to receive individual baked articles, means for sweeping an individual article into a carrier pocket, and means including a horizontally arranged carriage for limiting the movement of said sweeper.

WILLIAM EHRHART.